Feb. 18, 1958     H. L. LAMBERT     2,824,182
PNEUMATOELECTRIC RECORD SENSING DEVICE
Filed Jan. 9, 1957     2 Sheets-Sheet 1
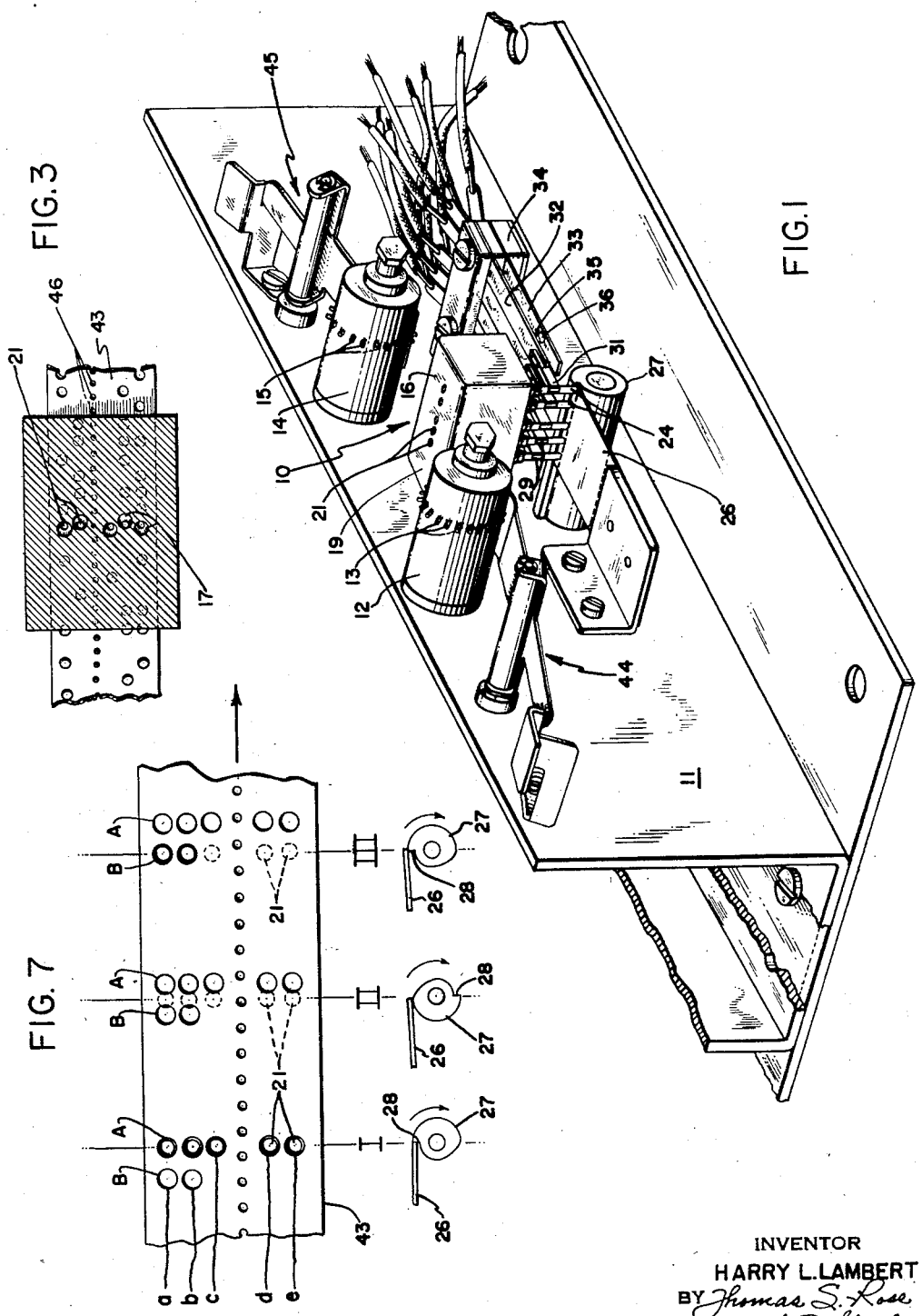
INVENTOR
HARRY L. LAMBERT
BY *Thomas S. Rose*
*Joseph R. Spalla*
ATTORNEYS

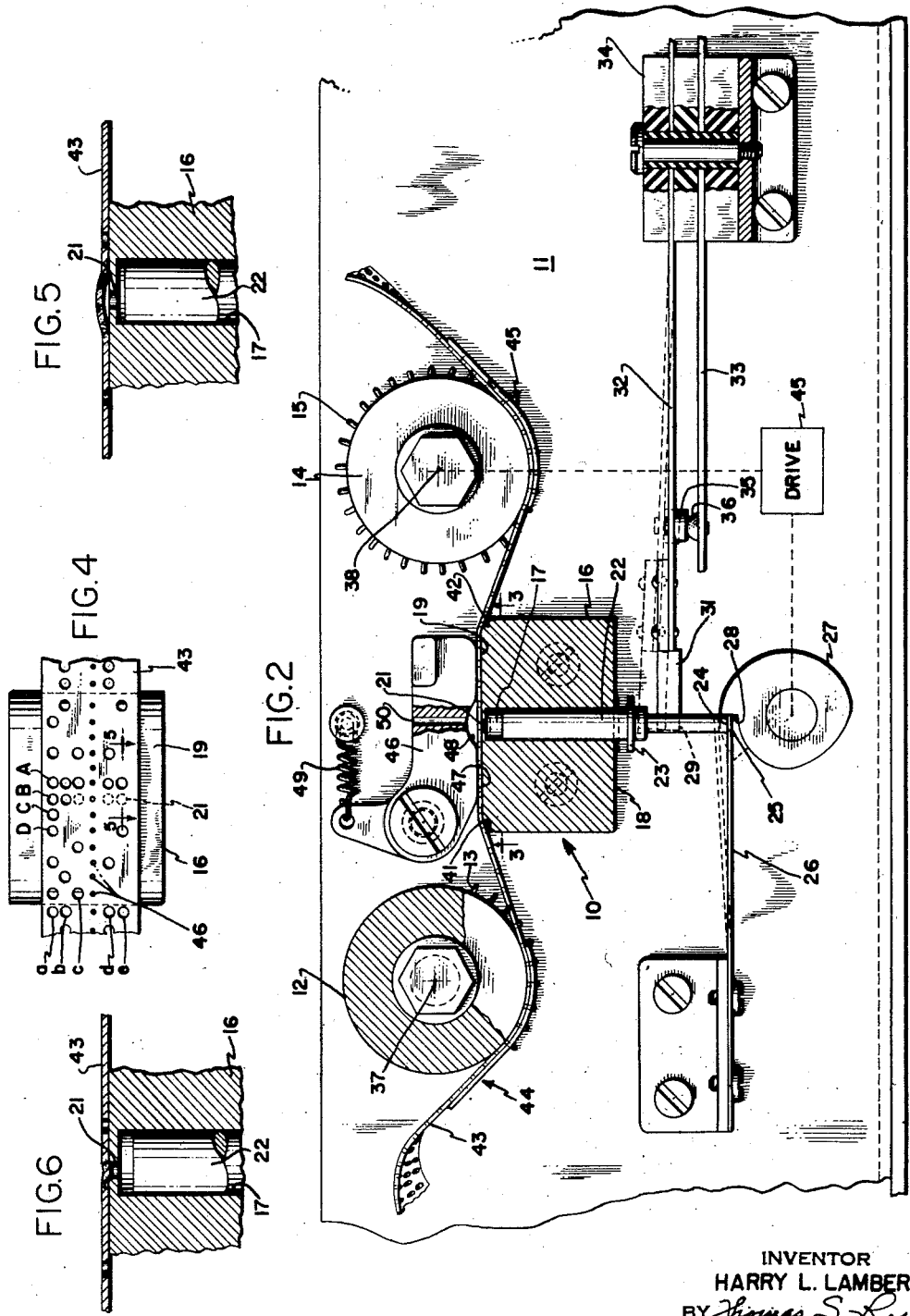

United States Patent Office 2,824,182
Patented Feb. 18, 1958

2,824,182

PNEUMATOELECTRIC RECORD SENSING DEVICE

Harry Long Lambert, West Hartford, Conn., assignor to Royal McBee Corporation, New York, N. Y., a corporation of New York Application January 9, 1957, Serial No. 633,202

6 Claims. (Cl. 200—46)

This invention relates generally to a reader or sensing device for perforated records, such as punched paper tapes, cards or the like, and more particularly to a pneumatoelectric record sensing or reading device which converts pneumatic conditions into electrical signals.

Mechanism embodying the invention is adapted for use generally in connection with data processing or like machines of various kinds, but has special utility when incorporated with typewriters for automatically decoding and typing information read from perforated records such as punched paper tapes.

There are many previously known mechanisms for reading or sensing information contained in perforated records and converting such information into electrical signals. For example, in mechanoelectric record sensing devices it is customary to employ sensing elements in the form of sensing pins or feelers which, in the absence of a perforation at the reading station, strike the record and are prevented from completing an electrical circuit, or in the presence of a perforation at the reading station are permitted to pass through the record to thereby complete the electrical circuit. The principal disadvantage of mechanoelectric reading or sensing devices is that when the records are fed at high speeds there is a tendency for the sensing pins or feelers to enlarge the perforations of the records, tear the records, or cause the sensing pins to indent the records when stopped thereby, particularly when the records are in the form of paper tapes. The pneumatoelectric sensing devices of the prior art, insofar as is known, all require the external generation of compressed air or the external generation of a vacuum.

In this invention a tape is sensed through the action of pistons operatively connected to spring switches. The pistons move periodically into vertical cylinders across the open tops of which passes a tape to be read. As the pistons rise the switches are opened. If perforations exist opposite the pistons at the top of their strokes the spring switches urge the pistons down and complete a circuit which indicates a perforation. If no perforations exist opposite the pistons at the top of their strokes, the vacuum in the area between the piston tops and the tape created by the downwardly urged pistons prevents any further downward movement and prevents the associated switches from closing thereby indicating the absence of a perforation.

The principal object of the present invention then is to provide an improved pneumatoelectric record sensing device which eliminates the use or need of vacuum pumps or any supply of compressed air, and to provide a sensing or reading device which will convert coded information in a perforated record into electrical signals without the necessity for passing any tangible element, such as the conventional sensing pins, through the perforations in the record.

Other objects of the invention are to provide a sensing or reading device for perforated records in which the necessity for accurate alignment of the record perforations with respect to the aperture in the sensing device is less critical; in which faster feeding of the perforated record is obtainable without loss of reading accuracy; in which accidental damage to the record or enlargement of the perforations therein as the record passes the sensing station is reduced to a minimum if not entirely eliminated; and a sensing device for perforated records the construction of which is extremely simple and economical to manufacture and the operation of which is fast, accurate, quiet and trouble free.

The above and still further objects of the invention will become apparent from a reading of the following description of a preferred constructional form, the appended claims, and the accompanying drawings, in which:

Fig. 1 is a perspective view of the improved tape reader mechanism;

Fig. 2 is a schematic diagram, partly in section of the reader mechanism shown in Fig. 1;

Fig. 3 is a cross sectional view of the reading head taken along lines 3—3 of Fig. 2;

Fig. 4 is a plan view of a section of a perforated tape overlying the reading head with a column of perforations in registry with ports in the reading head;

Fig. 5 is an enlarged cross sectional view of the reading head and perforated tape taken along lines 5—5 of Fig. 4 showing the relationship of the tape with respect to the reading head at a particular instant of time;

Fig. 6 is an enlarged cross sectional view of the reading head and perforated tape similar to Fig. 5 but taken at a later instant of time; and Fig. 7 is a view explanatory of a sequence of operations taking place when reading a perforated tape.

Referring now to the drawings wherein like reference characters designate like or corresponding parts throughout the several views there is shown in Figs. 1 and 2, which illustrates a preferred embodiment, a perforated tape reader mechanism, generally designated by reference numeral 10 which is mounted on a vertical support plate 11 between an idler roll 12 having sprocket pins 13 around its periphery intermediate its ends, and an identical driven feed roll 14 having sprocket pins 15 similar to those on the idler roll; both rolls being mounted for rotation on and with their axes perpendicular to the support wall.

The perforated tape reader mechanism 10 comprises a pneumatic reading head in the form of a rigidly mounted body 16 shown in the specific embodiment as a rectangular shaped metal block, which has formed therein a plurality of vertical cylindrical chambers 17 corresponding in number to the number of possible rows in columns of perforations in a perforated tape. The chambers are open at the bottom side 18 of the block and extend upwardly into the block a predetermined distance as shown in Fig. 2. The cylindrical chambers 17 are connected to the top surface 19 of the block by a plurality of relatively smaller diameter ports 21.

Mounted within the chambers 17 are a plurality of identical plungers or pistons 22 adapted for vertical movement therein; the upward movement of which is limited by means of circular flanges 23 or the like formed on the pistons intermediate their ends.

The chambers 17 are staggered as shown in Fig. 3 in order to provide the block with a plurality of optimum diameter bores with sufficient wall thickness between them. Optimum diameter cylindrical bores are desirable since larger working volumes between the piston tops and the top surface of the block are more efficient. The small ports 21 connecting the chambers 17 to the top surface 19 however, are eccentrically bored with respect to the chambers in order that they will be in transverse alignment as shown in Figs. 1 and 3. The bottom ends 24 of the pistons, in the preferred embodiment rest on the free end 25 of a relatively wide resilent spring steel plate 26 which as shown in the figure is secured at its other end to the support plate 11. Immediately below the free end 25 of the spring plate 26 there is mounted with its axis perpendicular to the support wall an elongated step cam 27 whose radius increases irregularly counter-clockwise from the bottom of its step 28 around to the crest of the step. As is apparent from Fig. 2 each revolution of the cam 27 lifts the spring plate 26 which in turn raises the pistons 22 up into their respective chambers 17. As will be understood, the spring plate, though not necessary to the invention, is utilized to prevent wear and jamming of the pistons and to prevent uneven wear of the cam surface. The pistons 22 are also provided adjacent their lower ends 24 with rectangular slots 29 or the like which are adapted to cooperate with complementary shaped extensions 31, preferably of insulating material, attached to movable spring switch arms 32 whereby the movable switch arms are adapted to move with their associated pistons. The movable switch arms 32 and stationary switch arms 33 are mounted in insulated relationship on a block 34 of insulating material which is rigidly secured to the support wall 11. All of the switch arms 32 and 33 carry contacts 35 and 36 respectively which are normally closed as seen in Fig. 2.

As most clearly seen in Fig. 2 the spaced idler and feed rolls 12 and 14 are mounted with their axes 37 and 38 in a common horizontal plane, and the top surface 19 of the block is mounted in a parallel horizontal plane a predetermined distance below the plane of said axes less than the radius of said rolls. The top surface 19 is bevelled along its edges 41 and 42 which face the rolls and is smoothly machined. With the rolls 12 and 14 so disposed with respect to the top surface 19 of the reading head it is apparent that a punched tape 43 will be moved by the feed rolls 12 and 14 past the reading head, riding flat and closely over the surface 19 of the reading head block 16. As is understood in the art both of the rolls 12 and 14 are provided with spring biased tape tensioning devices, generally designated by numerals 44 and 45 respectively operatively disposed against the underside of the idler and feed rolls.

Referring now to Fig. 4 there is shown a punched or perforated tape 43 having a plurality of transverse columns A, B, C, etc., each having a plurality of rows $a$, $b$, $c$, etc. The tape is also provided with feed holes 46 adopted to engage the sprocket pins 13 and 15 on the idler and feed rolls 12 and 14 respectively. As is understood in the art each column is representative of a character, different characters being represented by the presence or absence of a perforation in the rows.

In operation the feed roll 14 and the step cam 27 are driven in synchronism by any suitable drive means 45 (Fig. 2) i. e. for every complete cam revolution a perforated column moves past the ports 21. The sequence of operation is as follows:

Referring to Fig. 7 the first position shows the step cam 27 in an initial position (I) with the leaf spring and pistons at the bottom of the step 28 and the column A of tape perforations directly over the ports 21 in the reading head. In this position all the switch contacts 35 and 36 are closed indicating a perforation in all the rows of column A.

As the cam rotates between positions I and II it moves the pistons upward until at position II the pistons are almost at the top of their stroke; the tape 30 meanwhile having moved a predetermined distance to the right less than the distance between the columns A and B of perforations; during this interval all the switch contacts are opened since the movable switch arms are operatively connected to their respective pistons. As the pistons 22 are moving upward and for a predetermined time thereafter, i. e. the time it takes for the cam 27 to rotate from position I to II and from II to III, the latter moving the pistons to the top of their strokes, substantially all the air within the chambers 17 will have had sufficient time to be exhausted through the perforations in the tape or from between the tape 43 and the top surface 19 of the block where no perforations are opposite the ports 21. This condition is depicted in Fig. 5. During this exhaust interval, positions I to II and II to III, the tape 43 will have moved so that the next column B of perforations is in substantial alignment with the line of ports 21 in the block surface 19. Continued rotation from position III to I causes the leaf spring 26 to drop into the step of the cam 27; the moving spring switch arms 32 urging the pistons 22 downward out of the chambers 17 to the bottom of their stroke. The pistons 22 whose ports are in registry with perforated rows $a$ and $b$ of column B are open to the atmosphere and are pulled down by spring arms 32 thereby closing their respective switch contacts 35 and 36. The pistons 22 whose respective ports are not in registry with perforations in the tape however, are prevented from moving downward under urging of their respective switch arms 32 because of the creation of a vacuum (Fig. 6) in the space between the undersurface of the tape in the $c$, $d$ and $e$ rows of column B and the top of the pistons. Hence the switches operatively connected to the latter pistons remain open until a tape perforation in later columns passes over their respective ports at some subsequent time. It is apparent from the above that the tape being read acts as a valving member whose perforation pattern controls the atmospheric condition with the cylindrical chambers 17.

Referring again to Fig. 2 a tape old down block 46 may be employed if necessary to prevent tearing of the perforated tape by constraining the initial force of and delaying the exhaust of air during the exhaust interval. This is accomplished by providing the lower surface 47 of the hold down block adjacent the top surface 19 of the reading head with a transverse line of cylindrical concave depressions 48 corresponding in number to the number of ports 21 in the reading head and disposed directly over the ports 21. Each depression is connected to the top of the block through a channel 50 to facilitate the rapid ingress of air into the cylinders 17 when a perforation in the tape is opposite a port 21 at position III. The hold down block presses down on the tape with a force equivalent to the tension of a spring 49 connected to the hold down block and support wall. The pressure of the block is not sufficient to impede the travel of the tape 43 over the reading head surface.

Briefly then it is apparent that the invention provides a perforated tape reader which eliminates the necessity for sensing pins and external generation of vacuums or pressures by taking advantage of the valving action of the perforated tapes being read; a tape reader that is self contained, one which requires a minimum of parts, and one which more rapidly reads perforated tapes without sacrificing accuracy and without damaging the tapes being read.

It should be understood, of course, that the foregoing disclosure relates to only a preferred embodiment of the invention and that it is intended to cover all changes and modifications of the examples of the invention herein chosen for the purposes of the disclosure, which do not constitute departures from the spirit and scope of the invention.

The invention claimed is:

1. A pneumatoelectric perforated tape reading unit for sensing the presence or absence of perforations in a perforated tape comprising a reading head body, a plurality of vertical piston chambers within said body, a plurality of pistons within said chambers, a plurality of aligned openings connecting said chambers to the atmosphere, resilient means adapted to bias said pistons to the bottom of their strokes, means for overcoming said bias and for periodically moving said pistons to the top of their strokes, normally closed circuit means including switch contacts associated with said resilient means, and means operatively connecting said resilient means to said pistons, whereby movement of said pistons to the top of their strokes opens associated circuit means, said pistons remaining substantially at the top of their strokes if no tape perforations are opposite openings in the reading head thereby maintaining said circuit means opened, and said resilient means urging said pistons to the bottom of their strokes if tape perforations are opposite openings in the reading head thereby closing said switch contacts.

2. A pneumatoelectric reading unit for sensing the presence or absence of perforations in a perforated tape comprising a reading head, a plurality of piston chambers vertically disposed within said head, a plurality of openings connecting said chambers to a surface of said head, a plurality of pistons within said chambers, normally closed circuit means comprising a plurality of stationary switch contacts, resilient means, and a second plurality of switch contacts mounted on said resilient means, means connecting said resilient means to said pistons whereby said pistons are biased to the bottom of their strokes, and camming means for periodically moving said pistons to the top of their strokes thereby opening said circuit means, said pistons remaining at the top of their strokes or returning to the bottom of their strokes under the influence of said resilient means depending on the atmospheric conditions within said chambers resulting from the presence or absence of a perforation in a tape passing over the openings in the surface of said head.

3. A perforated tape reader for reading out perforated tapes having record data items in parallel columns across the shorter dimension thereof comprising a reading head assembly and means for moving said perforated tape in a direction transverse to said columns at a predetermined rate of speed past said reading head assembly, said reading head assembly comprising a block having a plurality of vertical cylindrical chambers therein, said cylindrical chambers being connected to the top of said block through a plurality of ports aligned transverse to the direction of tape movement, a plurality of pistons adapted to move within said chambers, normally closed switch contacts associated with each of said pistons including stationary switch arms and resilient switch arms, means connecting said resilient switch arms to said pistons for biasing said pistons against movement into said cylinders, and camming means for periodically lifting said pistons into said chambers in synchronism with said tape movement whereby the air in said chambers is exhausted and said switch contacts are opened, said resilient switch arms returning said pistons and closing said switch contacts when perforations are opposite ports associated with pistons at the top of their strokes, said resilient arms being unable to overcome the vacuum created by the partial downward movement of pistons from the top of their strokes when no perforations are opposite their associated ports, which vacuum thereby prevents the return of said latter pistons and closure of their associated switch contacts.

4. A perforated tape reader for reading out perforated tapes having record data items in parallel columns across the shorter dimensions thereof comprising a reading head assembly and means for moving said perforated tape in a direction transverse to said columns at a predetermined rate of speed past said reading head assembly, said reading head assembly comprising a body with a plurality of vertical open cylinders therein, the openings of said cylinders being perpendicular and aligned transverse to the direction of tape movement, a plurality of pistons adapted to move within said cylinders, means for periodically moving said pistons into said cylinders at a rate related to the rate of travel of said tape across said line of openings whereby the air in said cylinders is exhausted, circuit means, and means connected to each of said pistons adapted to open said circuit means as said pistons rise and to return said pistons and close said circuit means when perforations are opposite openings associated with pistons at the top of their stroke, said means being unable to overcome the vacuum created by the partial downward movement of pistons from the top of their strokes when no perforations are opposite their associated openings, which vacuum thereby prevents the return of said latter pistons and closure of their associated circuit means.

5. A perforated tape reader for reading out perforated tapes having record data items in parallel columns across the shorter dimension thereof comprising a reading head assembly and means for moving said perforated tape in a direction transverse to said columns at a predetermined rate of speed past said reading head assembly, said reading head assembly comprising a body having a plurality of vertical cylindrical chambers therein, said cylindrical chambers being connected to a surface of said body through a plurality of ports aligned transverse to the direction of tape movement, a plurality of pistons adapted to move within said chambers, camming means for periodically moving said pistons into said chambers at a rate related to the rate of travel of said tape over said line of ports whereby the air in said chambers is exhausted, circuit means, and resilient means connected to each of said pistons adapted to open said circuit means as said pistons rise and to return said pistons and close said circuit means when perforations are opposite ports associated with pistons at the top of their stroke, said resilient means being unable to overcome the vacuum created by the partial downward movement of pistons from the top of their strokes when no perforations are opposite their associated ports, which vacuum thereby prevents the return of said latter pistons and closure of their respective circuit means.

6. A pneumatoelectric reading unit for sensing the perforation pattern in a tape perforated in parallel columns across the shorter dimension thereof comprising a reading head having a plurality of chambers open to the atmosphere formed therein, said perforated columns being adapted to ride closely over and past said open chambers, means for periodically exhausting said chambers in synchronism with the motion of said perforated columns past said openings, the motion of said means after exhaustion of said chambers being arrested by the valving action of said tape whose perforation pattern thereafter controls the atmospheric condition within said chambers, and circuit means responsive to the motion of said means for exhausting said chambers.

References Cited in the file of this patent

UNITED STATES PATENTS

| 1,588,831 | Yokoyama | June 15, 1926 |
| 1,911,259 | Bergoin | May 30, 1933 |